(12) United States Patent
Isringhausen

(10) Patent No.: US 11,033,011 B2
(45) Date of Patent: Jun. 15, 2021

(54) BARBED FISHING ARROWHEAD

(71) Applicant: Kenneth A. Isringhausen, Carrollton, IL (US)

(72) Inventor: Kenneth A. Isringhausen, Carrollton, IL (US)

(*) Notice: Subject to any disclaimer, the term of this patent is extended or adjusted under 35 U.S.C. 154(b) by 267 days.

(21) Appl. No.: 16/179,621

(22) Filed: Nov. 2, 2018

(65) Prior Publication Data
US 2019/0124898 A1 May 2, 2019

Related U.S. Application Data

(60) Provisional application No. 62/580,767, filed on Nov. 2, 2017.

(51) Int. Cl.
*A01K 81/04* (2006.01)
*F42B 6/08* (2006.01)

(52) U.S. Cl.
CPC .............. *A01K 81/04* (2013.01); *F42B 6/08* (2013.01)

(58) Field of Classification Search
CPC .................................. A01K 81/04; F42B 6/08
USPC ............................................................. 43/6
See application file for complete search history.

(56) References Cited

U.S. PATENT DOCUMENTS

| | | | | |
|---|---|---|---|---|
| 3,022,077 A * | 2/1962 | Doonan | ..................... | F42B 6/08 473/583 |
| 3,036,395 A * | 5/1962 | Nelson | ..................... | F42B 30/14 43/6 |
| 3,036,396 A * | 5/1962 | Swails | ..................... | F42B 6/08 43/6 |
| 3,138,383 A * | 6/1964 | McKinzie | ................. | F42B 6/08 473/583 |
| 3,878,788 A * | 4/1975 | Ah Sam | ..................... | F41C 9/06 102/371 |
| 4,807,382 A * | 2/1989 | Albrecht | ................ | A01K 81/00 43/6 |
| 4,819,360 A * | 4/1989 | Thomas | ................ | A01K 81/04 43/6 |
| 4,905,397 A * | 3/1990 | Juelg, Jr. | ................... | F42B 6/04 43/6 |
| 5,570,530 A * | 11/1996 | Lee | ......................... | A01K 81/00 43/1 |
| 7,485,056 B2 * | 2/2009 | Sullivan | .................... | F42B 6/08 473/583 |
| 7,677,995 B1 * | 3/2010 | Sanford | .................... | F42B 6/08 473/583 |
| 10,041,772 B1 * | 8/2018 | Sullivan | .................... | F42B 6/08 |
| 2006/0154757 A1 * | 7/2006 | Sullivan | .................... | F42B 6/08 473/582 |

(Continued)

*Primary Examiner* — Claude J Brown
(74) *Attorney, Agent, or Firm* — Charles McCloskey

(57) ABSTRACT

A barbed fishing arrowhead has a ferrule having an aft end and an opposite fore end, a head adjoining to the fore end, a tip upon the head, and two barbs cooperatively engaging the head. The barbs fit within a chamber in the ferrule and rotate upon a pin also in a slot. The chamber includes an interior bumper towards the aft end that partially extends the barbs when retracted in the flight position. The barbs rotate outwardly following passage of the ferrule through a fish and engage the side of a fish until released by a fisherman. In an alternate embodiment, the invention has a smaller form with barbs having a sharper point and a tooth upon their leading edge.

14 Claims, 5 Drawing Sheets

(56) References Cited

U.S. PATENT DOCUMENTS

| | | | |
|---|---|---|---|
| 2010/0173734 A1* | 7/2010 | Robbins | F42B 6/08 |
| | | | 473/584 |
| 2015/0094175 A1* | 4/2015 | Sullivan | F42B 6/08 |
| | | | 473/583 |
| 2016/0174535 A1* | 6/2016 | Harshberger | F42B 6/08 |
| | | | 43/4.5 |
| 2017/0131073 A1* | 5/2017 | Buchanan | F42B 6/08 |
| 2017/0172123 A1* | 6/2017 | Sullivan | A01K 81/04 |

* cited by examiner

BARBED FISHING ARROWHEAD

CROSS-REFERENCE TO RELATED APPLICATION

This non-provisional application claims priority to provisional application No. 62/580,767 filed on Nov. 2, 2017, all of which are owned by the same inventor.

BACKGROUND OF THE INVENTION

The present invention relates generally to archery and more particularly to arrowheads used in fishing. The barbed fishing arrowhead has particular utility with retaining a fish upon it and then releasing itself from the fish at the discretion of the archer.

Grown tired of plants and small mammals, man has sought fish as sustenance for millennia. Fishermen have sought fish using various techniques and equipment during those eons. The techniques include grabbing by hand, deadfalls, throwing of rocks, setting traps in rocks, casting nets, throwing spears, using rods, using poles, throwing shafts, shooting arrows, and the like. However, fish remain crafty, elusive, and clever prey to man. Man must work much and with diligence to catch fish. Though this specification mentions man and fisherman, that is in a broad sense to include all persons, for as President Hoover once remarked, "all men are equal before fish."

A fish is a lively creature with a hydrodynamic body covered in scales. The fish competes with its kind for food and evades predators that may beset it. In short, fish can be difficult to catch. Man faces a challenge in catching fish for eating, let alone larger quantities.

Fishing has its industrial operations that do catch large numbers of fish using ships and nets. Fishing though for the most part has individuals who seek fish. This application and invention serve the individual fisherman. In recent decades, fishing has evolved from sustenance to a sport. Fishermen compete in various locales and with various equipment during tournaments for no prize and for big prizes. The equipment includes archery and the sport has the name of bow fishing.

The barbed fishing arrowhead of the present invention is desirable for smooth flight of an arrow to a fish and then embedment of the fish upon it so that the fish does not wriggle away. Fishermen dislike loss of a fish after diligent pursuit, rough weather, turbulent water and the like. Though the loss of a fish spawns tales aplenty, those who have fished know the ill will generated when a fish gets away.

From time to time, a fisherman receives inspiration to improve his tackle. A fisherman analyzes the fish and its behavior and may notice a way to keep the fish caught. The wriggling action of a fish may remove it from a hook, a lure, or an arrowhead. Other components may secure the fish thought the fisherman must deliver those components to the fish.

Many fishermen have used their own tackle, devices, and cunning to catch fish. Bow fishermen carry on that tradition. Though this description has used man in its general sense for all persons and fishermen in its more specific sense, modern catchers of fish include many women. As this application goes forward, the usage of the term fishermen is meant to include women.

DESCRIPTION OF THE PRIOR ART

Bow fishermen benefit from the equipment and techniques that came before them. Bow fishermen use arrows initially designed for target shooting and then the pursuit of game. Such arrows generally fly through air and then impact and enter a target. The arrow's flight velocity and momentum allow it to penetrate well into a target as many a hay bale can attest. However, an arrow behaves differently in water and a fish behaves and wriggles aplenty.

In recent centuries, man has used spears thrown directly at fish. Man must see the fish for this equipment and technique to succeed. Man generally attempts this in clear waters with minimum turbulence. Man must have clear vision and a strong arm to succeed at spear fishing. A fishing spear generally has a long shaft and a tip. When thrown, the spear flies towards a fish and with a little luck, the tip penetrates a fish and the fish remains stuck upon the shaft.

Along with spears, recent decades have had man use archery to catch fish. An archer spots a fish also in clear, less turbulent waters then shoots an arrow towards the target fish. With a little luck, the arrowhead penetrates the fish, the fish remains upon the arrow's shaft, and the fisherman finds the arrow. Many a fisherman has seen fish swim off with an arrow and the waters take a fish from him. Select fishermen have shot arrows having lines attached to them towards fish targets. The lines assist in retrieving the arrows and any fish upon them. However, the lines affect the flight characteristics of the arrows and thus the accuracy of hitting a fish.

Though preceding description has referred to bow fishing along a stream, the description also applies to fishing along lakes, at a beach, and aboard water crafts at locales around the world. While the above-described devices fulfill their respective, particular objectives and requirements, the aforementioned devices do not describe a barbed fishing arrowhead that reaches a fish and then keeps the fish stuck upon it.

Therefore, a need exists for new and improved barbed fishing arrowhead that can be used for reaching a fish, retaining the fish upon the arrowhead, and then releasing the fish to the bow fisherman upon command. In this regard, the present invention substantially fulfills this need. In this respect, the barbed fishing arrowhead according to the present invention substantially departs from the conventional concepts and designs of the prior art, and in doing so provides a device primarily developed for the purpose of retaining a fish upon an arrowhead and related shaft in nearly any fishing location.

The barbed fishing arrowhead overcomes the above-mentioned disadvantages and drawbacks of the prior art. As such, the general purpose of the present invention, which will be described subsequently in greater detail, is to provide a new and improved barbed fishing arrowhead which has all the advantages of the prior art mentioned heretofore and many novel features that result in a barbed fishing arrowhead which are not anticipated, rendered obvious, suggested, or even implied by the prior art, either alone or in any combination thereof.

SUMMARY OF THE INVENTION

The barbed fishing arrowhead has a ferrule having an aft end and an opposite fore end, a head adjoining to the fore end, a tip upon the head, and two barbs cooperatively engaging the head. The barbs fit within a chamber in the ferrule and rotate upon a pin also in a slot. The chamber includes an interior bumper proximate the aft end that guides the barbs slightly outward after the flight position. The barbs rotate outwardly following passage of the ferrule through a fish and engage the side of a fish until released by a fisherman. In an alternate embodiment, the invention has a smaller form with barbs having a sharper point and a tooth upon their leading edge.

There has thus been outlined, rather broadly, the more important features of the invention in order that the detailed description thereof that follows may be better understood and in order that the present contribution to the art may be better appreciated. Additional features of the invention will be described hereinafter and which will form the subject matter of the claims attached.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and devices for carrying out the several purposes of the present invention. It is important, therefore, that the claims be regarded as including such equivalent constructions insofar as they do not depart from the spirit and the scope of the present invention.

It is therefore an object of the present invention to provide a new and improved barbed fishing arrowhead that may be easily and efficiently manufactured and marketed to the consuming public.

Another object of the present invention is to provide a barbed fishing arrowhead for smooth flight of an arrow to a submerged target.

Another object of the present invention is to provide a barbed fishing arrowhead that engages the side of a fish preventing the fish from wriggling off the arrowhead.

Another object of the present invention is to provide a barbed fishing arrowhead that a fisherman may release from a fish without tearing the fish.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

In referring to the drawings,

FIG. 11a is a partial exploded view of an alternate embodiment of the tip of the present invention;

The same reference numerals refer to the same parts throughout the various figures.

DESCRIPTION OF THE PREFERRED EMBODIMENT

Figure 1:
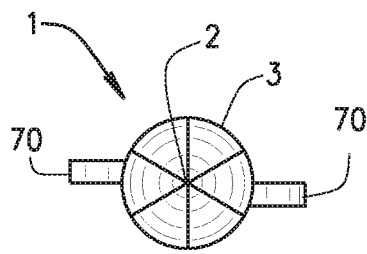
FIG. 1 is a front of the preferred embodiment of the present invention.

Referring now to the drawings, and particularly to FIGS. 1 through 19, a preferred embodiment of the barbed fishing arrowhead of the present invention is shown by the reference numeral 1. In FIG. 1, the present invention 1 appears in a front view and has a centered pointed tip 2 with a six sided pyramidal or rounded head 3 behind it, extending into the plane of the figure. The tip serves as the tip of a rounded conical shape forming the head. Outwardly from the head, the invention 1 has two mutually spaced apart barbs 70 also mutually offset upon a common plane. In this view, the barbs show a rectangular form however, later figures will show the actual key shape of the barbs. Here, the barbs extend radially outward from the tip upon a common diameter but with one barb shown upwardly and the other barb shown downwardly from the common diameter. The barbs generally denote the sides of the invention and they extend outwardly from those sides during usage. In this figure, the barbs have a position near the head and thus show the invention ready for flight to a target, typically a fish.

Figure 2:
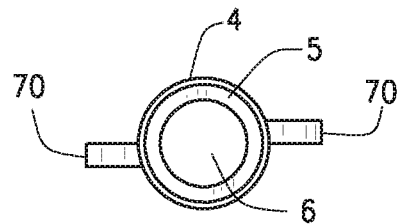
FIG. 2 is a back view of the present invention.

Opposite FIG. 1, FIG. 2 shows a back view of the invention connected to a shaft 6, typically used in arrows. Outwardly from the shaft, the invention has a ferrule 4 of similar diameter as that of the head and the ferrule extends coaxial with the head. The head and ferrule having the same diameter assists with entry of the invention into the target. The ferrule extends into the plane of this figure. The ferrule has a generally elongated cylindrical form with a length and a diameter perpendicular to the length. The ferrule has an aft end 5 here shown ahead of the shaft and slightly into the plane of this figure. The aft end also has a round shape that widens in its diameter for a short length of the ferrule, as later shown in FIG. 3, to the same diameter as the remainder of the ferrule. The aft end generally has a flat surface perpendicular to the length of the ferrule. In an alternate embodiment, the aft end in cooperation with the ferrule has a rounded shape suitable for improved aerodynamic performance of the invention. Outwardly from the ferrule, the invention has its two barbs 70 here shown mutually spaced apart and offset as before. The barbs have a curved face shown on edge in this figure which will appear more readily in FIG. 3. As before, the barbs occupy a common diameter and slightly extend radially outward from the ferrule as the barbs occupy the flight position of the invention.

Figure 3:
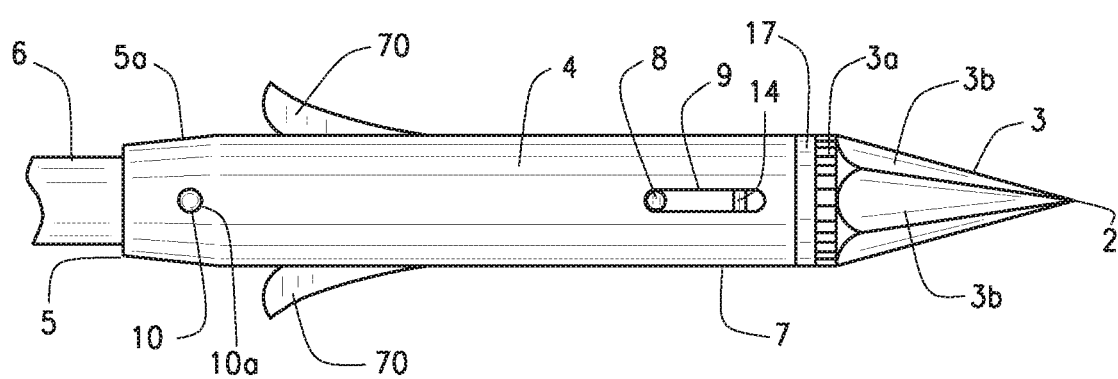
FIG. 3 is a top view of the present invention in flight position.

FIG. 3 then shows a top or plan view of the invention in the flight position. The flight position has the barbs 70 close to the ferrule 4. The invention has its head 3 of a six sided pyramidal shape with a tip 2 here to the right. The head has six faces, as at 3b, equi-angularly spaced about the tip 2. In this view three faces 3b appear. Each face starts at the tip 2 then widens rearward to a curved portion. Opposite the tip, the head has a band of knurling 3a proximate the base of the pyramidal shape and each curved portion of a face 3b transitions to the knurling 3a. The knurling assists a fisherman in manipulating the invention as later shown. The head abuts a shoulder 17 of short cylindrical form, here shown on edge as a rectangle akin to a disc. Connected to the head, the shoulder 17 then abuts the ferrule 4. The ferrule has an elongated cylindrical shape as shown where the length exceeds the diameter by at least a factor of three. The ferrule has a length to width, or diameter, ratio suitable for aerodynamic performance yet capable of entering the target. The ferrule has a fore end 7 generally opposite the aft end, inward from the shoulder 17, and away from the head 3. The fore end has similar diameter as the ferrule and the aft end. The fore end has a generally flat surface. Inwardly from the fore end 7, the ferrule has a short lengthwise slot 9 and denoting the top of the invention. The slot has a width markedly less than the diameter of the ferrule. The slot then has its length also markedly less than the length of the ferrule, generally less than 15%. The slot contains a pin 8 here showing its head. The pin operatively connects to the barbs 70 and to the head 3 as later shown in FIG. 11. The slot also reveals a portion of one O-ring 14 later shown in FIG. 9. The portion of the O-ring remains within the ferrule and radially inward from the slot as shown in this figure. Further along the length of the ferrule, the barbs 70 extend slightly outwardly here in the flight position. The barbs have a swept back orientation with a narrow portion shown towards the head and a wider portion shown towards the aft end 5. The wider portion of the barb has a convex curvature as shown. The barbs extend outwardly from the sides of the invention thus towards the top and the bottom of this figure. Away from the barbs towards the aft end, the ferrule has a rivet 10 through an aperture 10a. The rivet extends through the ferrule and connects into the shaft 6 thus securing the invention upon the shaft as an arrow. The rivet has a smooth finish to the surface of the ferrule. That smooth finish is an alternate embodiment of the pin 8. In a further alternate embodiment, the ferrule has a pinned connection to the shaft or a press fit upon the shaft. The aft end also has a tapered shape as at 5a that narrows in its diameter for a short length of the ferrule from approximately the aperture 10a with the rivet 10 rearward to the aft end. The tapered shape as at 5a also functions as a rear taper. The tapered shape of the ferrule begins at the same diameter as the remainder of the ferrule then narrows.

Figure 4:
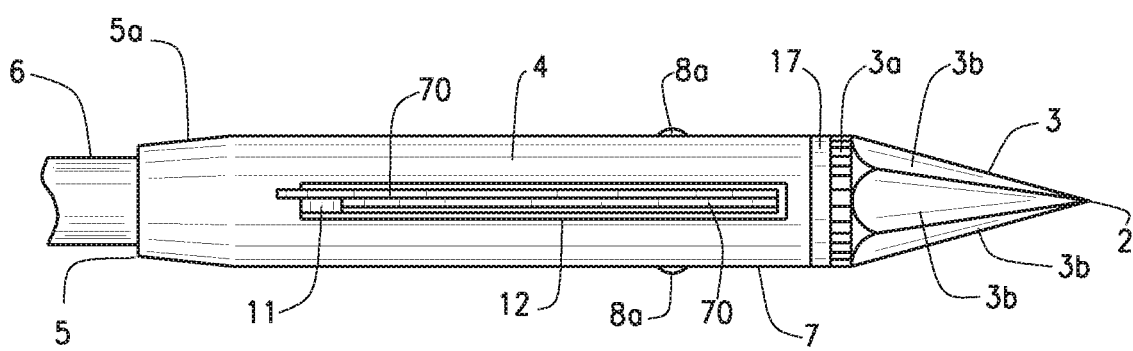
FIG. 4 is a side view of the present invention in flight position.

Rotating the invention axially, FIG. 4 shows a side view of the invention with the tip 2 to the right, an upper barb 70 to the left and extending beyond the slot 9, and a lower barb 70 to the left and beneath the upper barb while locating into the plane of this figure. The invention connects to the shaft 6 using the rivet 10 in the aperture 10a through the ferrule inwardly from the aft end 5. The ferrule expands through the taper 5a from the aft end 5. The ferrule continues rightward from the shaft with its diameter typically exceeding that of the shaft as shown. The ferrule has a chamber 12 extending for most of its length and through the diameter of the ferrule and the chamber has a generally centered position in the ferrule and parallel to the length of the ferrule. The chamber receives the upper barb 70 shown upwardly in the chamber and slightly extending left of the chamber and the counterpart lower barb 70 beneath the upper barb. To do so, the chamber has a generally rectangular shape with a length proportional to that of a barb and a height slightly more than that thickness of both barbs. Each barb fits into the chamber and slightly beyond towards the aft end, and has little if any frictional engagement to the ferrule outwardly of the chamber. Towards the shaft, the chamber includes a bumper 11 placed or machined approximately in the center of the ferrule at the leftmost end of the chamber in this figure, opposite the head 3. The bumper initially guides the barbs outwardly from a flush position with the ferrule to the flight position previously shown in FIG. 3. The bumper itself has a triangular form with the base oriented towards the aft of the chamber and the point oriented towards the fore of the chamber, that is, towards the head. In an alternate embodiment, the bumper includes its own pin inserted transverse through the bumper. The barbs fit into the chamber and receive the pin 8 inserted through the ferrule and the chamber. The pin travels in the slot 9 has a perpendicular orientation to the chamber. In the preferred embodiment, the pin has both of its ends formed into rivets as at 8a. In an alternate embodiment, the pin has a swaged fit into the barbs. Outwardly from the chamber 12 and the fore end 7, the invention has its shoulder 17 that abuts the knurling portion 3a on the faces 3b of the head 3 that then merge to a common point or the tip 2.

Figure 5:
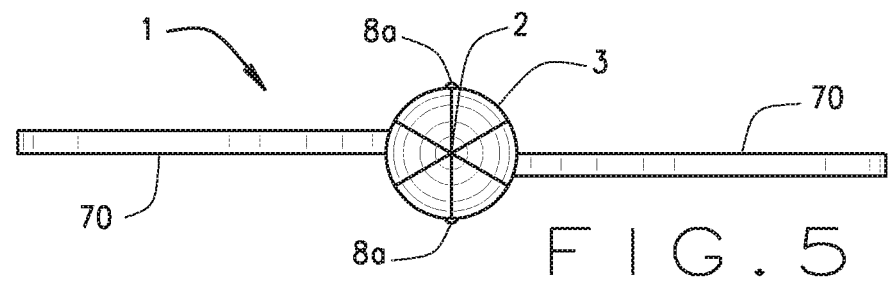
FIG. 5 is a front view of the present invention in deployed position.

Once the invention flies to the target and enters it, the invention must retain the target, here a fish. The fish will squirm mightily and FIG. 5 shows a front view of the invention to keep the fish upon it. The invention has its tip 2 upon the head 3 and the barbs 70 behind the head. Unlike FIG. 1, here, the barbs fully extend outwardly from the ferrule of the invention 1 as they rotate upon the pin secured by its rivets 8a. Each barb has a length extended that exceeds at least twice the diameter of the ferrule. The barbs have a generally thin, elongated form as shown. The barbs extend outwardly in the deployed position of the invention with the upper barb, here shown to the left, slightly above the lower barb, here shown to the right. A fisherman would see this view when checking if the invention penetrated through the fish.

Figure 6:
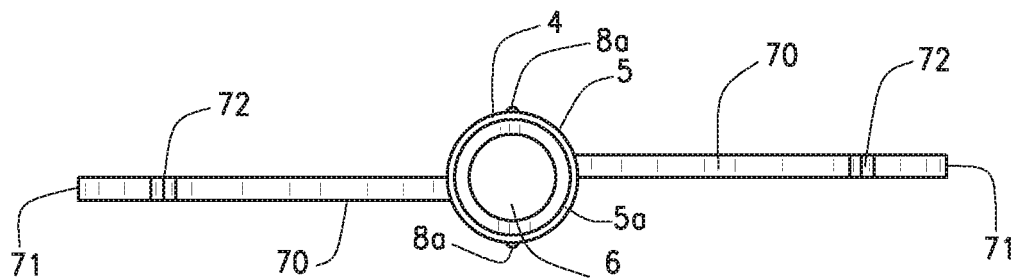
FIG. 6 is a back view of the present invention in deployed position.

The fish though would feel the barbs more from the back view shown in FIG. 6. The invention has the barbs 70 in the deployed position as shown. The ferrule 4 has its round shape as before with the shaft 6 connecting through the aft end of the ferrule at the end of the tapered portion 5a. The barbs extend outwardly from the sides of the invention with the upper barb shown to the right and the lower barb shown to the left in this figure. Each barb 70 has its elongated form but on this edge shown, the barb has a notch 72 outwardly from the ferrule and proximate a barb tip 71. Each notch has a generally V shape here shown on edge. As later shown, the notches improve the grip of the barbs upon a fish in the deployed position of the invention. More particularly, the notches 72 fit upon the bumper 11. The notches urge the barbs slightly outwardly during flight, impact on the fish, and entry of the invention into the fish. The notches prevent the fish from compressing the barbs inwardly and swimming off the invention, thus escaping from the fisherman.

Figure 7:
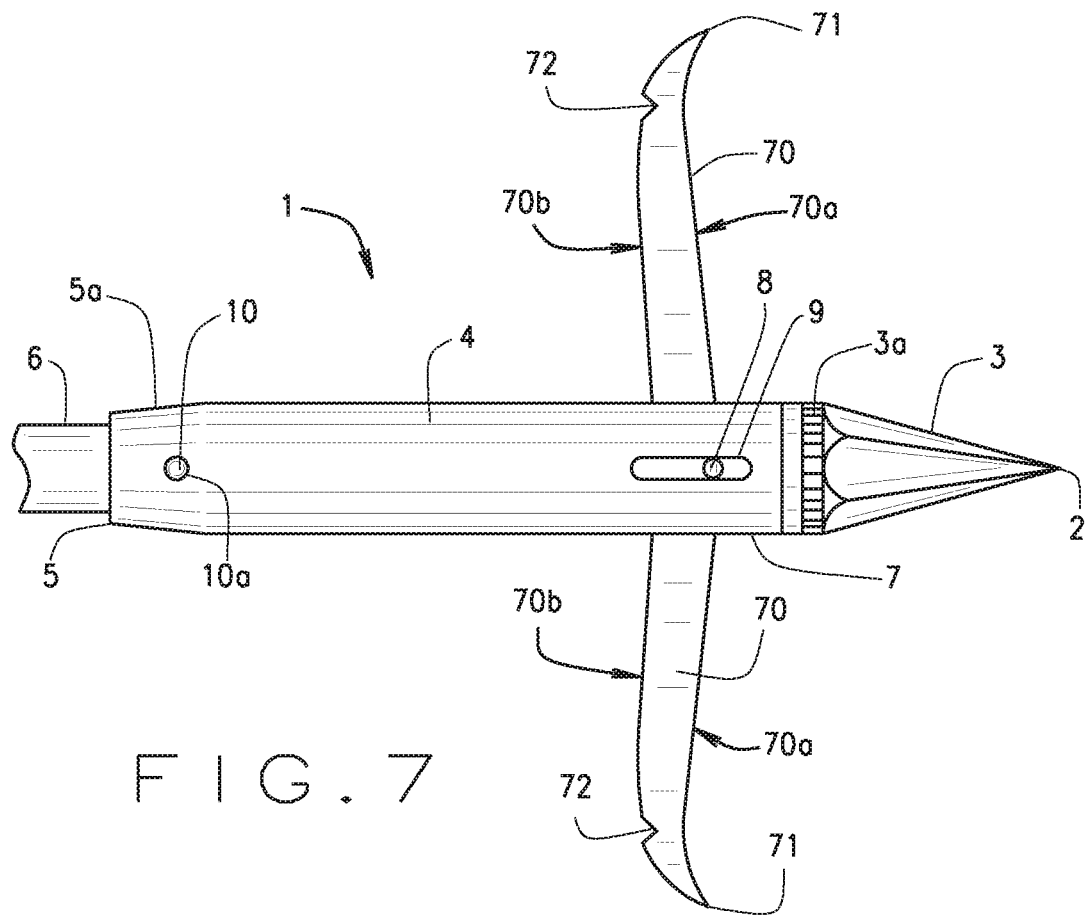
FIG. 7 is a top view of the present invention in deployed position.

Now though, the flight position has passed as the invention has entered the target and seeks to retain the target—the fish—upon the invention. FIG. 7 shows a top view of the invention in the deployed position to retain a fish. In the deployed position, the invention has the barbs 70 extending outwardly from the ferrule 4 in a near T like shape. Each barb is nearly perpendicular to the ferrule. Each barb has a wide portion near the ferrule that tapers outwardly to the notch 72 on a trailing edge 70b, that is, edge away from the tip 2, the trailing edge then curves slightly forward to the barb tip 71. The barb tip then curves from the tip on a leading edge 70a, that is, edge towards the tip 2, and then widens linearly towards the ferrule. The two barbs operatively connect at a common pivot point upon the pin 8 in the slot 9. Here in the deployed position, the pin 8 has moved towards the fore end 7, the shoulder 17, and the head 3.

Figure 8:
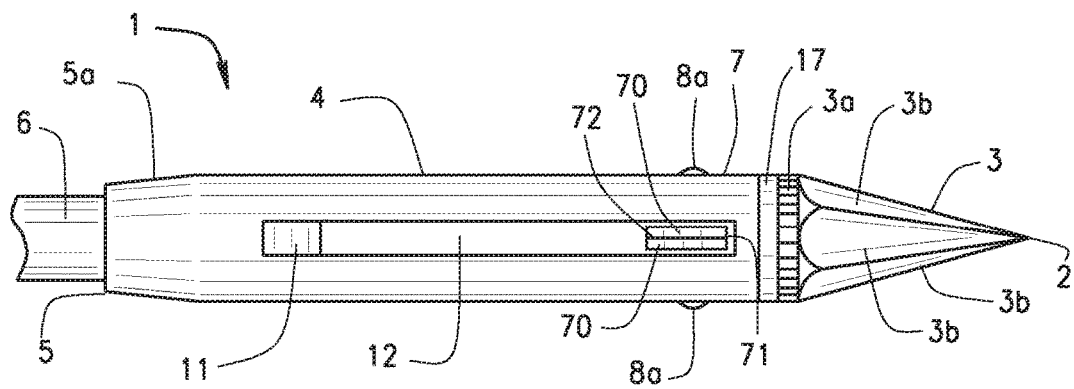
FIG. 8 is a side view of the present invention in deployed position.

Rotating the invention from FIG. 7, FIG. 8 shows the invention in the deployed position but in a side view. The invention connects to the shaft 6 using the rivet 10 through the aperture 10a and the ferrule 4 as before. The pin 8 towards the head 3, secures the barbs 70 into the chamber 12 of the ferrule. Beneath the pin in the figure, the upper of the two barbs 70 extends outwardly from the plane of the figure and has its barb tip 71 towards the head 3 while the lower of the two barbs 70 extends inwardly from the plane of this figure and its tip is not shown. Both barbs have a generally rectangular cross section in this view. The upper of the two barbs shows its tip 71 towards the reader with its notch 72 slightly to the left. Rearward from the barbs, the chamber 12 has its thin, hollow, rectangular shape, generally open as the barbs have deployed out of it. Opposite the barbs, the chamber has its bumper 11 that assists with the opening of the barbs 70 to the deployed position. Further opposite the bumper, the ferrule has its shoulder 17 that then abuts the knurling 3a of the faces 3b of the head 3 and the faces 3b tapers to the tip 2.

Figure 9:
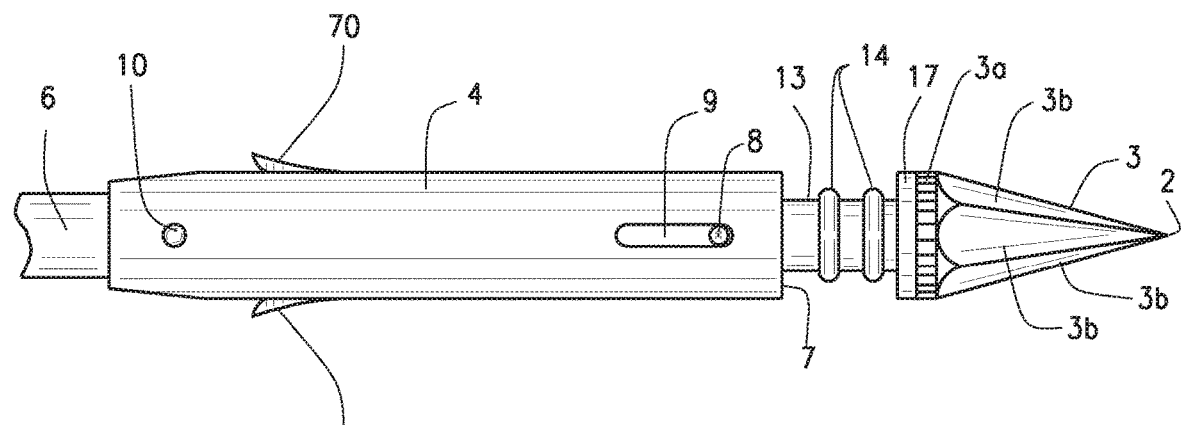
FIG. 9 is a top view of the present invention with the head partially removed.

With the fish under control, the fisherman will have to remove the invention from it. FIG. 9 has a top view preparing the invention for removal from a fish. The invention has its ferrule 4 connected to the shaft 6 by the rivet 10 as before. The ferrule has its diameter and the tapered section towards the aft end. and the barbs 70 barely appear outwardly from the ferrule. The pin 8 has advanced to an end of the slot 9 towards the head 3. The head 3 though has a spacing outwardly from the ferrule. By pulling the head outwardly from the ferrule, the fisherman retracts the barbs completely inside of the ferrule, or the retracted position. The head 3 has its tip 2 with faces 3b and knurling portions 3a as before. Opposite from the tip and stepped in from the maximum diameter of the head, the arrowhead 1 has its stem 13. The stem has a generally round form and a diameter less than that of the head but more than half of the head's diameter. The stem fits into a cooperating opening in the fore end 7 of the ferrule. That opening communicates with the chamber. The stem has two mutually parallel and spaced apart O-rings 14 upon it and that encircle it, effectively double O-rings. The O-rings have a position towards the head and extend slightly outward from the surface of the stem. The O-rings have a spacing between them of at least half the thickness of one O-ring 14. The O-ring shown to the left in this figure generally abuts, or sits flush with the fore end 7. Opposite the O-rings and the fore end, the stem has its shoulder 17. Before FIG. 9, placing the head adjacent to the ferrule increased the frictional contact between the O-rings 14 and the cooperating opening thus keeping the head engaged to the ferrule during flight and later when the fish squirms. More particularly, the two O-rings 14 cooperate and pull a partial vacuum within the ferrule. The partial vacuum creates resistance to the head slipping outwardly from the ferrule. Pulling the head outwardly from the ferrule requires deliberate action by the fisherman.

Figure 10:
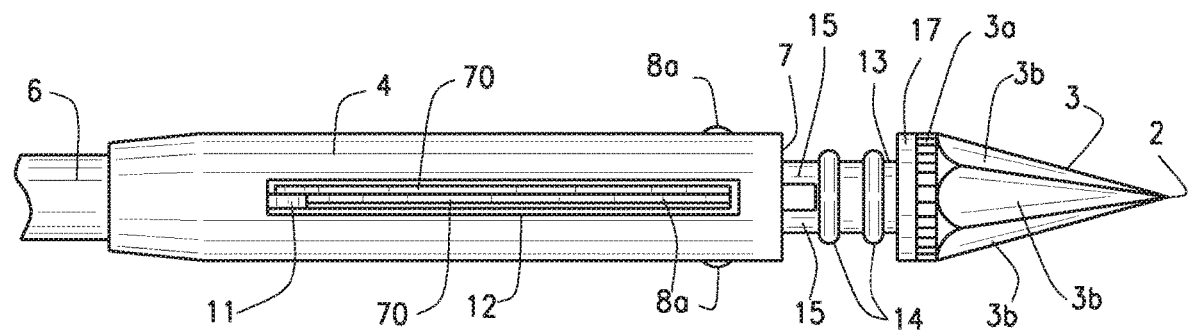
FIG. 10 is a side view of the present invention with the head partially removed.

FIG. 10 then shows the invention from the side with the head 3 pulled outwardly from the ferrule. In doing this, the barbs 70 fully retract into the chamber 12 and leave no edges outside of the diameter of the ferrule. In this figure, the upper barb 70 has its full length shown in the chamber while below it, the lower barb 70 has its apparent length truncated by the bumper 11. The head has its generally pyramidal form with the tip 2 widening to the knurling portion 3a on its faces 3b abutting the shoulder 17, and then joining to the stem 13. The stem has the O-rings 14 along its length spaced slight away from the head. Outwardly from the O-rings, the stem 13 separates into two mutually parallel and spaced apart prongs 15 outwardly from the grooves. The spacing as at 15a between the prongs admits the wide portions of the barbs during the flight position and other usages of the invention. The prongs 15 receive the pin 8 generally transverse and receive the barbs 70 in a spacing 15a between the prongs as the prongs cooperatively engage the barbs during axial motion of the head relative to the ferrule for the flight position, the deployed position, and the retracted position of the arrowhead.

Figure 11:
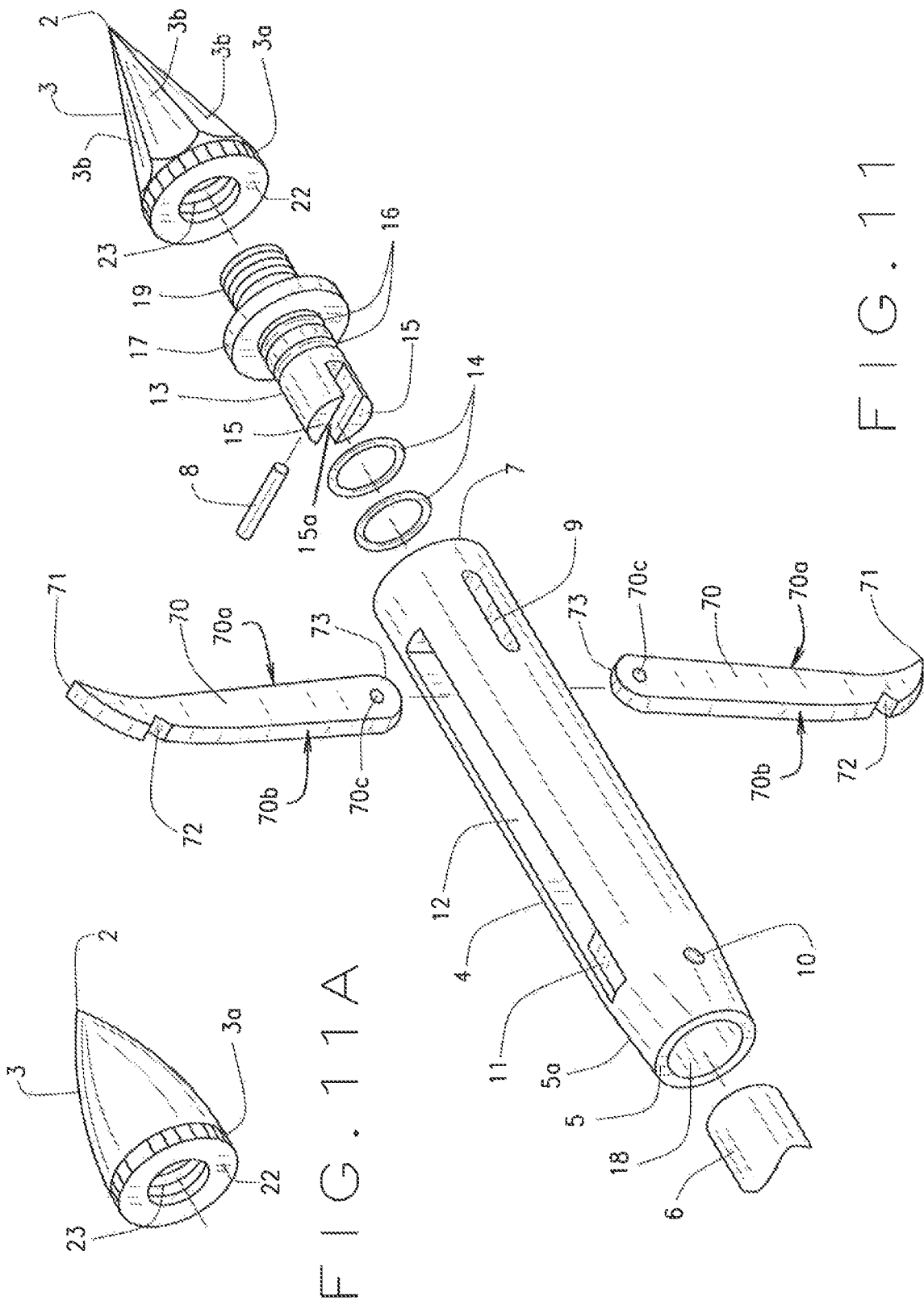
FIG. 11 is an exploded view of the present invention.

Then, FIG. 11 shows the invention when in the deployed position but in an exploded view. The invention connects to the shaft 6 at an aperture 18 in the aft end 5 of the ferrule 4. The ferrule widens from the tapered portion 5a to its diameter. In an alternate embodiment, the ferrule comes from a hollow tube. Meanwhile, the preferred embodiment of the ferrule has the chamber 12 extending for most of its length along the side. Towards the aperture and away from the head, the chamber includes the bumper 11. The chamber has its rectangular shape of length and height suitable to admit the barbs 70 as previously shown and described. Each barb has a curved shape as shown. The barb begins with a wide portion, 73, somewhat rounded shown towards the ferrule. The wide portion has an aperture that receives the pin 8 and the aperture has an inward spacing from the notch 72. The barb slightly narrows then widens along its length and outwardly from the ferrule on the leading edge 70a where the width of the barb is perpendicular to its length. Then the trailing edge 70b of the barb has the notch 72 and the barb curves and tapers abruptly to the barb tip 71. Outwardly from the fore end, the two O-rings 14 remain ready to fit within the ferrule and over the stem 13 that connects to the head 3. The stem has its two prongs 15 with their spacing suitable for receiving the two wide portions of the barbs. The pin 8 has its position to fit into the ferrule as previously shown, through a cooperating aperture in the prongs 15 and into the wide portions of the barbs. The prongs 15 have a gap 15a between them that allows for rotation of the barbs when upon the pin during its usage through three positions. Outwardly from the prongs, the stem has two spaced apart and parallel grooves 16 that receive the O-rings upon inserting the prongs 15 into the ferrule 4 as the head moves towards the ferrule. Outwardly from the two grooves 16, the stem continues to the shoulder 17 here shown in a disc like shape of a diameter greater than that of the stem 13. The shoulder has a thickness generally less than its diameter. The shoulder then joins to a male threaded cylinder 19 of similar effective diameter. The cylinder 19 then engages a female threaded port 23 of the head. The port opens in a rear face 22 of the head opposite the tip. The rear face has a generally flat form that abuts the shoulder and generally defines a plane perpendicular to the length of the invention. Away from the rear face, the head has its knurling portion 3a that then extends into the six faces 3b that converge upon the tip 2. The head is removable from the cylinder by a fisherman rotating it thereby disengaging the threaded connection. Though this figure shows a hexagonal pyramidal shape of the head, the Applicant foresees the head having a conical, rounded conical, or pyramidal shape.

FIG. 11a shows an alternate embodiment of the head 3 of invention 1 in an exploded view. This alternate embodiment has a rounded, conical shaped tip 2, here shown to the right of the head. Opposite the tip, the head has a band of knurling 3a proximate the base of the conical shape. The knurling aids a fisherman in attaching and detaching the head from the male cylinder 19, previously shown in FIG. 11. This alternate embodiment of the head also has a female threaded port 23 opposite the tip that opens into a rear face 22 of the head. The rear face has a generally flat form suitable to abuts the shoulder 17 as shown in FIG. 11. Also, the rear face generally defines a plane perpendicular to the length of the head, and of the invention.

Figure 12:
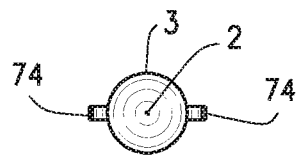
FIG. 12 is a front view of an alternate embodiment of the invention in flight position.

FIG. 12 then shows an alternate embodiment of the invention from the front, in flight position ready to find a fish. It has a centered pointed tip 2 with a rounded head 3 behind it, extending into the plane of the figure. The tip is the point of a rounded conical shape forming the head. Outwardly from the head, the alternate embodiment has two mutually spaced apart and coplanar second barbs 74. The second barbs and this alternate embodiment have a smaller size than the preferred embodiment. The alternate embodiment seeks a more specific fish than that sought by the preferred embodiment. In this view, the second barbs show a rectangular form with an inner portion and an outer portion, however, later figures will show the actual shape of the second barbs. Here, he second barbs extend radially outward from the tip upon a common diameter during usage and generally denote the sides of the invention.

Figure 13:
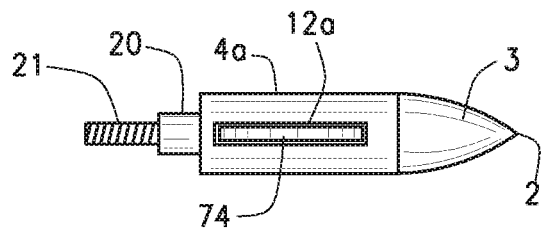
FIG. 13 is a side view of an alternate embodiment of the invention in flight position.

FIG. 13 then has a side view of the alternate embodiment of the invention in flight position with the tip 2 to the right and one second barb 74 to the left. The invention has a second ferrule 4a that continues from the head to the left. Opposite the head, the second ferrule 4a has a base 20 centered and coaxial generally behind the second barbs as shown. The base has a lesser diameter than the second ferrule. Then opposite the second ferrule 4a, the base has the second shaft 21 with its diameter less than that of the base and much less than that of the second ferrule. The second shaft has threading typically for engaging an existing arrow shaft, not shown. The second ferrule continues rightward from the base with its diameter typically exceeding that of the base as shown. The second ferrule has a chamber 12a extending for most of its length and through the diameter of the second ferrule. The chamber receives the second barb 74 shown and the counterpart second barb not shown in this figure. To do so, the chamber has a generally rectangular shape with a length proportional to that of a second barb and a height slightly more than that thickness of a second barb. The second barb fits within the chamber and has little if any frictional engagement to the second ferrule outwardly of the chamber. The second barbs fit within the chamber and receive the pin 8 inserted through the second ferrule and the chamber. Outwardly from the chamber 12a and the pin 8, the invention may have a further alternate embodiment with knurling upon a portion of the head suitable for gripping by the fisherman.

Figure 14:
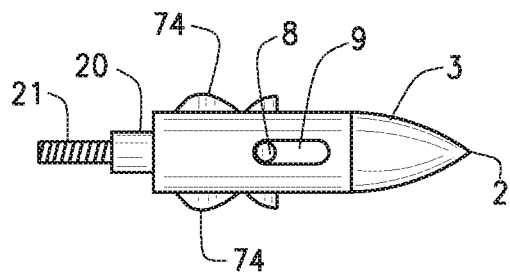
FIG. 14 is a top view of an alternate embodiment of the invention in flight position.

FIG. 14 is a top view of the alternate embodiment of the invention in flight position. The flight position has the second barbs 74 close to the second ferrule 4a. The invention has its head 3 of a rounded conical shape with a tip 2 here to the right. The head connects to the second ferrule 4 generally opposite the base 20 and the second shaft 21. The second ferrule has an elongated cylindrical shape as shown where the length exceeds the diameter by at least a factor of three. The second ferrule has a length to width, or diameter, ratio suitable for aerodynamic performance yet capable of entering the target. Inwardly from the head 3, the second ferrule has a short lengthwise slot 9 and denoting the top of the invention. The slot has a width markedly less than the diameter of the second ferrule. The slot then has its length also markedly less than the length of the second ferrule, generally less than 15%. The slot contains the pin 8 here showing its own head and the pin operatively connects to the second barbs 74 as later shown in FIG. 18. Further along the length of the second ferrule, the second barbs 74 extend slightly outwardly here in the flight position. The second barbs have a swept back orientation with a fore portion shown towards the head and a longer aft portion shown towards the base 20. The fore portion has a flat front edge and the aft portion has a convex curvature as shown. The second barbs extend outwardly from the sides of the invention thus towards the top and the bottom of this figure. Away from the second barbs and opposite the head, the second ferrule 4a has the base 20 and the second shaft 21 as previously described.

Figure 15:
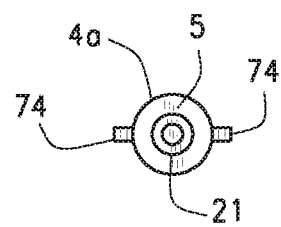
FIG. 15 is a back view of an alternate embodiment of the invention in flight position.

FIG. 15 is a back view of the alternate embodiment of the invention in flight position with its second shaft centered upon the base 20 in the foreground. Outwardly and behind the base, the invention has the second ferrule 4a of similar diameter as that of the head. The head and second ferrule having the same diameter assists with entry of the invention into the target. The second ferrule extends into the plane of this figure. The second ferrule has an aft end here shown ahead of the base and slightly into the plane of this figure. The aft end also has a round shape of similar diameter as the remainder of the second ferrule. The aft end generally has a flat surface perpendicular to the length of the second ferrule. In an alternate embodiment, the aft end in cooperation with the second ferrule has a rounded shape suitable for improved aerodynamic performance of the invention. Outwardly from the second ferrule, the invention has its two second barbs 74 here shown mutually spaced apart and in the same plane as before. The second barbs have a curved face shown on edge in this figure which will appear more readily in FIG. 18. As before, the second barbs occupy a common diameter and slightly extend radially outward from the second ferrule as the second barbs occupy the flight position of the invention.

Figure 16:
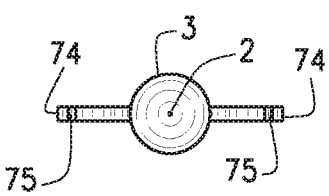
FIG. 16 is a front view of an alternate embodiment of the invention in deployed position.

FIG. 16 is a front view of the alternate embodiment of the invention in deployed position though with the second barbs 74 closer to the second ferrule 4a than in the preferred embodiment. As before, the deployed position has the second bars set to keep the fish upon the invention. The invention has its tip 2 upon the head 3 and the second barbs 74 behind the head. Unlike FIG. 12, in this figure, the second barbs fully extend outwardly from the second ferrule shown in this alternate embodiment. Each second barb has a length extended that exceeds at least one half of the diameter of the second ferrule. The second barbs have a generally thin, elongated form as shown. The second barbs extend outwardly in the deployed position of the invention. A fisherman would see this view when checking if the invention had penetrated through the fish.

Figure 17:
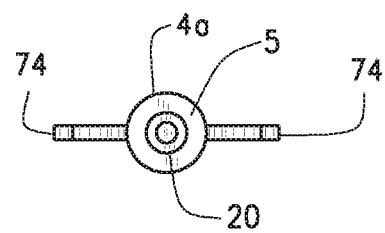
FIG. 17 is a back view of an alternate embodiment of the invention in deployed position.

FIG. 17 is a back view of the alternate embodiment with the second barbs 74 in the deployed position as shown. The second ferrule 4a has its round shape as before with the base 20 extending outwardly from the second ferrule. The second barbs extend outwardly from the sides of the invention. Each second barb 74 has its elongated form but on this edge shown, the second barb has an apparent step where the fore portion has slightly greater width than the aft portion.

Figure 18:
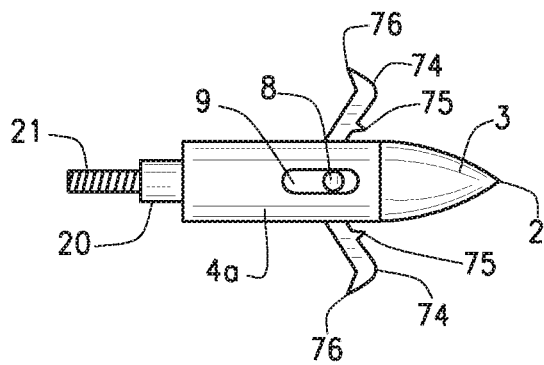
FIG. 18 is a top view of an alternate embodiment of the invention in deployed position; and, FIG. 19 is a side view of an alternate embodiment of the invention in deployed position.

FIG. 18 is a top view of the alternate embodiment of the invention in deployed position to retain a fish. In the deployed position, the invention has the second barbs 74 extending outwardly from the second ferrule 4a in a partially swept forward, near T like shape. Each second barb makes an acute angle with the center line of the second ferrule towards the tip 2. Each second barb has a nearly constant width portion near the second ferrule that extends outwardly. Approximately halfway along the length of the second barb, each second barb has a tooth 75. Each tooth has a pointed form similar to a triangle. The teeth face in the same direction as the tip 2 and penetrate through the fish during entry thus allowing the remainder of the second barb to unfold and deploy against the side of the fish. Outwardly from the tooth on each second barb, the width of the second barb continues and then the second barb curves rearward abruptly as shown to the second barb tip 76. The second barb tip has a generally triangular shape with its point oriented opposite that of the tip 2. The second barb tip 76 then embeds into the side of the fish and minimizes rotation of the invention relative to the fish. The two second barbs operatively connect at a common pivot point upon the pin 8 in the slot 9. Here in the deployed position, the pin 8 has moved towards the head 3.

Figure 19:
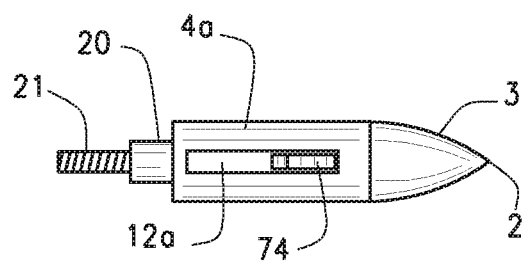

Then, FIG. 19 is another view of the alternate embodiment of the invention in deployed position, but from the side. The invention connects to an arrow using its second shaft 21 extending from the base 20 of the second ferrule 4a as before. The pin 8 towards the head 3 secures the second barbs 74 into the chamber 12a of the second ferrule. Beneath the pin in the figure, the second barb 74 extends outwardly from the plane of the figure and has its second barb tip 76 towards the head 3. The second barb has a generally rectangular cross section in this view. Rearward from the second barb, the chamber 12a has its thin rectangular shape, generally open as the second barbs have deployed out of it. Opposite the second barbs, the chamber has its bumper 11 that sets the second barbs 74 slightly outward of the ferrule when in the flight position. Further opposite the pin and the two second barbs, the head 3 conically tapers to the tip 2. In an alternate embodiment, the chamber has a magnet, as at 11, that attracts and retains the second barbs 74 when in the flight position.

And, in this alternate embodiment shown in FIGS. 12-19, the head operatively connects to the second barbs utilizing the pin and has similar assembly as that shown in FIG. 11. When the time comes, the preferred embodiment and the alternate embodiment of the barbed fishing arrowhead stand ready to assist fishermen of all ages, genders, and abilities in the ages old quest to catch fish: fish on!

While a preferred embodiment of the barbed fishing arrowhead has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any suitable sturdy material such as plastic, polymer, metal, composite, fiber, and the like may be used. Although an arrow for shooting from a bow to a fish has been described, it should be appreciated that the barbed fishing arrowhead herein described is also suitable for spears, pikes, poles, and the like used at streams, rivers, ponds, lakes, lagoons, bays, sounds, inlets, reefs, beaches, and oceans where fish swim.

The Applicant reminds the reader that the invention is not a toy, it is not designed for a person to lean upon, stand upon, sit on, nor is it suitable for supporting a load over its rated capacity. The present invention may have its tip pointed, edges sharpened, and pinch points, thus it is to be treated with respect.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Various aspects of the illustrative embodiments have been described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations have been set forth in order to provide a thorough understanding of the illustrative embodiments. However, it will be apparent to one skilled in the art that the present invention may be practiced without the specific details. In other instances, well known features are omitted or simplified in order not to obscure the illustrative embodiments.

Various operations have been described as multiple discrete operations, in a manner that is most helpful in understanding the present invention, however, the order of description should not be construed as to imply that these operations are necessarily order dependent. In particular, these operations need not be performed in the order of presentation.

Moreover, in the specification and the following claims, the terms "first," "second," "third" and the like—when they appear—are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to ascertain the nature of the technical disclosure. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A barbed fishing arrowhead for mounting upon a shaft, comprising:
   a ferrule, generally cylindrical and elongated, having a length and a diameter perpendicular to the length, having a chamber generally centered upon said ferrule and parallel to the length of said ferrule;
   two barbs fitting within said chamber, said barbs operatively connected by a pin through said ferrule, said pin travelling in a slot in said ferrule, said slot being spaced away from and perpendicular to said chamber;
   a head operatively connecting to said pin, said head having a similar diameter as said ferrule and extending coaxial with said ferrule, said head tapering to a tip;
   a bumper within said chamber opposite said head;
   wherein said barbed fishing arrowhead transitions from a flight position with said barbs adjacent to said ferrule to a deployed position with said barbs outwardly from said ferrule to a retracted position with said barbs within said ferrule during an episode of fishing;
   each of said barbs having a length and a width perpendicular to the length;
   each of said barbs commencing from a wide portion then extending for the length to a barb tip, each of said barb tips orienting towards said head;
   each of said barbs having a notch towards said barb tip; and,
   the wide portion of each of said barbs having an aperture that admits said pin, said aperture being spaced inwardly from said notch of each of said barbs.

2. A barbed fishing arrowhead for mounting upon a shaft, comprising:
   a ferrule, generally cylindrical and elongated, having a length and a diameter perpendicular to the length, having a chamber generally centered upon said ferrule and parallel to the length of said ferrule;
   two barbs fitting within said chamber, said barbs operatively connected by a pin through said ferrule, said pin travelling in a slot in said ferrule, said slot being spaced away from and perpendicular to said chamber;
   a head operatively connecting to said pin, said head having a similar diameter as said ferrule and extending coaxial with said ferrule, said head tapering to a tip;
   a bumper within said chamber opposite said head;
   wherein said barbed fishing arrowhead transitions from a flight position with said barbs adjacent to said ferrule to a deployed position with said barbs outwardly from said ferrule to a retracted position with said barbs within said ferrule during an episode of fishing;
   a stem connecting to said head opposite said tip, said stem being of lesser diameter than said head;
   said stem having two circumferential grooves spaced outwardly from said head and an O-ring fitting into each groove;
   two mutually parallel and spaced apart prongs extending outwardly from said grooves; and,
   wherein said prongs receive said pin generally transverse and receive said barbs in a spacing between said prongs wherein said prongs cooperatively engage said barbs during axial motion of said head relative to said ferrule for the flight position, the deployed position, and the retracted position of said arrowhead.

3. The barbed fishing arrowhead of claim 2 further comprising:
   said stem having a shoulder outwardly of said grooves and of said prongs, said shoulder having a disc shape with its diameter greater than the remainder of the stem, and a threaded cylinder outwardly of said shoulder and opposite said prongs, said threaded cylinder having its diameter as that of the remainder of the stem.

4. The barbed fishing arrowhead of claim 3 further comprising:
   said head having a face opposite said tip, said face having a flat form capable of abutting said shoulder and a threaded port therein, said threaded port engaging said threaded cylinder of said stem.

5. The barbed fishing arrowhead of claim 4 wherein said head has a shape of one of conical, rounded conical, pyramidal, and hexagonal pyramidal.

6. A barbed fishing arrowhead for mounting upon a shaft, comprising:
   a head, having a diameter and tapering to a tip;
   a stem connecting to said head opposite said tip, said stem being of lesser diameter than said head, said stem operatively connecting to a pin;
   two barbs operatively connected to said pin;
   a ferrule, generally cylindrical and elongated, having a length and a diameter perpendicular to the length the diameter of said ferrule being that of said head and said ferrule being coaxial with said head, a chamber generally centered upon said ferrule and parallel to the length of said ferrule, and a slot proximate said head and spaced away from and perpendicular to said chamber;
   said pin travelling in said slot in said ferrule and said barbs fitting within said chamber as said barbs operate upon said pin through said ferrule;
   said chamber having a bumper interiorly opposite said head, said bumper receiving said barbs; and,
   wherein said barbed fishing arrowhead transitions from a flight position with said barbs adjacent to said ferrule to a deployed position with said barbs outwardly from said ferrule to a retracted position with said barbs within said ferrule during an episode of fishing.

7. The barbed fishing arrowhead of claim 6 further comprising:
   said head having a face opposite said tip, said face having a flat form and a threaded port centered therein, said threaded port engaging said stem.

8. The barbed fishing arrowhead of claim 7 further comprising:
   said stem having a threaded cylinder engaging said threaded aperture of said head, said threaded cylinder having its diameter as that of the remainder of the stem, a shoulder having a disc shape with its diameter greater than the remainder of the stem and being opposite said threaded cylinder, two circumferential grooves spaced outwardly from said shoulder and opposite said threaded cylinder, two O-rings wherein each of said O-rings fits into one of said grooves, two mutually parallel and spaced apart prongs extending outwardly from said grooves opposite said shoulder, said prongs receiving said pin generally transverse and receiving said barbs in a spacing between said prongs wherein said prongs cooperatively engage said barbs during axial motion of said stem relative to said ferrule for the flight position, the deployed position, and the retracted position of said arrowhead;

said face of said head having a flat surface abutting said shoulder; and, said ferrule having a fore end proximate said head, said fore end receiving said stem and an opposite aft end adapted to receive an arrow shaft.

9. The barbed fishing arrowhead of claim 6 further comprising:

each of said barbs having a length and a width perpendicular to the length;

each of said barbs commencing from a wide portion then extending for the length to a barb tip, each of said barb tips orienting towards said head; and, each of said barbs having a notch towards said barb tip.

10. The barbed fishing arrowhead of claim 9 further comprising:

the wide portion of each of said barbs having an aperture that admits said pin, said aperture being spaced inwardly from said notch of each of said barbs;

the wide portion of one of said barbs stacking upon the wide portion of the other of said barbs wherein apertures of each of said barbs align and receive said pin; and, wherein said barbs rotate upon said pin.

11. The barbed fishing arrowhead of claim 10 further comprising:

said barbed fishing arrowhead having said flight position upon said pin positioning in said slot away from said head thus retaining said barbs adjacent to said bumper;

said barbed fishing arrowhead having said deployed position upon said barbs positioning outwardly from said ferrule following engagement with a fish; and, said barbed fishing arrowhead having said retracted position upon said pin positioning in said slot towards said head thus retaining said barbs entirely within said chamber for removal of said arrowhead from a fish.

12. The barbed fishing arrowhead of claim 11 further comprising:

each of said barbs having a trailing edge from said wide portion to said notch to said tip and a leading edge opposite said trailing edge from said wide portion to said tip.

13. A barbed fishing arrowhead for mounting upon a shaft, comprising:

a ferrule, generally cylindrical and elongated, having a length and a diameter perpendicular to the length, having a chamber generally centered upon said ferrule and parallel to the length of said ferrule;

two barbs fitting within said chamber, said barbs operatively connected by a pin through said ferrule, said pin travelling in a slot in said ferrule, said slot being spaced away from and perpendicular to said chamber;

a head operatively connecting to said pin, said head having a similar diameter as said ferrule and extending coaxial with said ferrule, said head tapering to a tip;

a bumper within said chamber opposite said head;

a stem connecting to said head opposite said tip, said stem being of lesser diameter than said head, said stem operatively connecting to a pin;

said head having a face opposite said tip, said face having a flat form and a threaded port centered therein, said threaded port engaging said stem;

said stem having a threaded cylinder engaging said threaded aperture of said head, said threaded cylinder having its diameter as that of the remainder of the stem, a shoulder having a disc shape with its diameter greater than the remainder of the stem and being opposite said threaded cylinder, two circumferential grooves spaced outwardly from said shoulder and opposite said threaded cylinder, two O-rings wherein each of said O-rings fits into one of said grooves, two mutually parallel and spaced apart prongs extending outwardly from said grooves opposite said shoulder, said prongs receiving said pin generally transverse and receiving said barbs in a spacing between said prongs wherein said prongs cooperatively engage said barbs during axial motion of said stem relative to said ferrule for the flight position, the deployed position, and the retracted position of said arrowhead, said face having a flat surface abutting said shoulder;

said ferrule having a fore end proximate said head, said fore end receiving said stem and an opposite aft end adapted to receive an arrow shaft;

each of said barbs having a length and a width perpendicular to the length, commencing from a wide portion then extending for the length to a barb tip, having a notch towards said barb tip, each of said barb tips orienting towards said head;

the wide portion of each of said barbs having an aperture that admits said pin, said aperture being spaced inwardly from said notch of each of said barbs, the wide portion of one of said barbs stacking upon the wide portion of the other of said barbs wherein apertures of each of said barbs align and receive said pin, wherein said barbs rotate upon said pin, wherein said barbed fishing arrowhead transitions from a flight position with said barbs adjacent to said ferrule to a deployed position with said barbs outwardly from said ferrule to a retracted position with said barbs within said ferrule during an episode of fishing.

14. The barbed fishing arrowhead of claim 13 further comprising said barbed fishing arrowhead having said flight position upon said pin positioning in said slot away from said head thus retaining said barbs adjacent to said bumper;

said barbed fishing arrowhead having said deployed position upon said barbs positioning outwardly from said ferrule following engagement with a fish;

said barbed fishing arrowhead having said retracted position upon said pin positioning in said slot towards said head thus retaining said barbs entirely within said chamber for removal of said arrowhead from a fish; and, each of said barbs having a trailing edge from said wide portion to said notch to said tip and a leading edge opposite said trailing edge from said wide portion to said tip.

* * * * *